(12) United States Patent
Spivak et al.

(10) Patent No.: US 11,347,544 B1
(45) Date of Patent: May 31, 2022

(54) SCHEDULING WORK ITEMS BASED ON DECLARATIVE CONSTRAINTS

(71) Applicant: Facebook Technologies, LLC, Menlo Park, CA (US)

(72) Inventors: Vadim Victor Spivak, Redwood City, CA (US); Bernhard Poess, Redmond, WA (US)

(73) Assignee: Facebook Technologies, LLC., Menlo Park, CA (US)

( * ) Notice: Subject to any disclaimer, the term of this patent is extended or adjusted under 35 U.S.C. 154(b) by 111 days.

(21) Appl. No.: 16/584,539

(22) Filed: Sep. 26, 2019

(51) Int. Cl.
*G06F 9/48* (2006.01)
*G06F 9/50* (2006.01)
*G06F 9/46* (2006.01)

(52) U.S. Cl.
CPC .............. *G06F 9/4881* (2013.01); *G06F 9/46* (2013.01); *G06F 9/461* (2013.01); *G06F 9/466* (2013.01); *G06F 9/48* (2013.01); *G06F 9/485* (2013.01); *G06F 9/4806* (2013.01); *G06F 9/4843* (2013.01); *G06F 9/4887* (2013.01); *G06F 9/4893* (2013.01); *G06F 9/50* (2013.01); *G06F 9/5005* (2013.01); *G06F 9/505* (2013.01); *G06F 9/5011* (2013.01); *G06F 9/5022* (2013.01); *G06F 9/5027* (2013.01);
(Continued)

(58) Field of Classification Search
CPC . G06F 9/46; G06F 9/461; G06F 9/466; G06F 9/48; G06F 9/4806; G06F 9/4818; G06F 9/4843; G06F 9/485; G06F 9/4881; G06F 9/4887; G06F 9/50; G06F 9/5005; G06F 9/5011; G06F 9/5022; G06F 9/5027; G06F 9/5044; G06F 9/505; G06F 9/5083; G06F 2209/501
See application file for complete search history.

(56) References Cited

U.S. PATENT DOCUMENTS

| 2004/0015973 A1* | 1/2004 | Skovira | G06F 9/4881 718/103 |
| 2009/0049451 A1* | 2/2009 | Bates | G06F 9/461 718/108 |

(Continued)

OTHER PUBLICATIONS

Jantz et al., "A Framework for Application Guidance in Virtual memory Systems", VEE'13, Mar. 16-17, Houston Texas, 2013, ACM, pp. 155-165 (Year: 2013).*

*Primary Examiner* — Charles M Swift
(74) *Attorney, Agent, or Firm* — Baker Botts L.L.P.

(57) ABSTRACT

In one embodiment, a method includes generating one or more queues by an application executing on a client system, wherein each queue is associated with one or more declarative attributes, wherein each declarative attribute declares a processing requirement or a processing preference, generating one or more work items to be processed, for each of the one or more work items enqueuing the work item into a selected one of the one or more queues based on the one or more declarative attributes associated with the selected queue, and providing the one or more queues to a scheduler of an operating system of the client system, wherein the scheduler is configured to schedule each of the one or more work items for processing based on one or more policies and the one or more declarative attributes of the selected queue for that work item.

19 Claims, 5 Drawing Sheets (52) U.S. Cl.
CPC .......... *G06F 9/5044* (2013.01); *G06F 9/5083* (2013.01); *G06F 9/5094* (2013.01); *G06F 2209/501* (2013.01)

(56) References Cited

U.S. PATENT DOCUMENTS

| | | | | |
|---|---|---|---|---|
| 2009/0222654 | A1* | 9/2009 | Hum | G06F 1/3203 |
| | | | | 713/100 |
| 2011/0145616 | A1* | 6/2011 | Rychlik | G06F 9/5027 |
| | | | | 713/323 |
| 2013/0346994 | A1* | 12/2013 | Chen | G06F 9/5044 |
| | | | | 718/104 |
| 2014/0317631 | A1* | 10/2014 | Ryshakov | G06F 9/4843 |
| | | | | 718/103 |
| 2015/0150016 | A1* | 5/2015 | Kim | G06F 9/4881 |
| | | | | 718/103 |
| 2015/0293787 | A1* | 10/2015 | Bilavarn | G06F 1/26 |
| | | | | 718/102 |
| 2016/0004569 | A1* | 1/2016 | Kim | G06F 9/5027 |
| | | | | 718/104 |
| 2017/0068574 | A1* | 3/2017 | Cherkasova | G06F 9/4881 |
| 2017/0139745 | A1* | 5/2017 | Scheuer | G06F 9/4881 |
| 2018/0349183 | A1* | 12/2018 | Popovic | G06F 9/5038 |

* cited by examiner

SCHEDULING WORK ITEMS BASED ON DECLARATIVE CONSTRAINTS

TECHNICAL FIELD

This disclosure generally relates to operating systems.

BACKGROUND

An operating system (OS) is system software that manages computer hardware and software resources and provides common services for computer programs. Time-sharing operating systems schedule tasks for efficient use of the system and may also include accounting software for cost allocation of processor time, mass storage, printing, and other resources. For hardware functions such as input and output and memory allocation, the operating system acts as an intermediary between programs and the computer hardware, although the application code is usually executed directly by the hardware and frequently makes system calls to an OS function or is interrupted by it. Operating systems are found on many devices that contain a computer—from cellular phones and video game consoles to web servers and supercomputers.

In computing, scheduling is the method by which work is assigned to resources that complete the work. The work may be virtual computation elements such as threads, processes or data flows, which are in turn scheduled onto hardware resources such as processors, network links or expansion cards. A scheduler is what carries out the scheduling activity. Schedulers are often implemented so they keep all computer resources busy (as in load balancing), allow multiple users to share system resources effectively, or to achieve a target quality of service. Scheduling is fundamental to computation itself, and an intrinsic part of the execution model of a computer system; the concept of scheduling makes it possible to have computer multitasking with a single central processing unit (CPU). Scheduling handles the removal of the running process from the CPU and the selection of another process on the basis of a particular strategy. Scheduling is an essential part of a Multiprogramming operating systems. Such operating systems allow more than one process to be loaded into the executable memory at a time and the loaded process shares the CPU using time multiplexing.

SUMMARY OF PARTICULAR EMBODIMENTS

In particular embodiments, an operating system may optimize CPU power usage by allocating work items into different queues based on the declarative constraints of the work items and then processing the queued work items accordingly as determined by a scheduler. Once the work items in one or more queues are processed in accordance with their declarative constraints, one or more cores of the CPU may enter a sleep mode until a wake-up signal is received for processing additional work items, thereby resulting in efficient usage of CPU power (longer, less fragmented sleep time allows the CPU to enter a deeper sleep state). To begin with, an application may create a few queues with each being associated with certain declarative attributes defined by the application. The operating system may then enqueue work items into different queues by considering the relationship between the declarative constraints and the declarative attributes. Based on the queued work items and the corresponding declarative attributes, the scheduler may determine how the work items should be processed. Furthermore, each of the cores may have its own computing feature, e.g., high performance or energy efficiency. The scheduler may further determine which core to use for particular queued work items based on such computing feature. Although this disclosure describes scheduling particular work items via particular systems in particular manners, this disclosure contemplates scheduling any suitable work item via any suitable system in any suitable manner.

In particular embodiments, the operating system may generate, by an application executing on a client system, one or more queues. Each queue may be associated with one or more declarative attributes. Each declarative attribute may declare a processing requirement or a processing preference. In particular embodiments, the operating system may then generate one or more work items to be processed. For each of the one or more work items, the operating system may enqueue the work item into a selected one of the one or more queues based on the one or more declarative attributes associated with the selected queue. In particular embodiments, the operating system may further provide the one or more queues to a scheduler of an operating system of the client system. The scheduler may be configured to schedule each of the one or more work items for processing based on one or more policies and the one or more declarative attributes of the selected queue for that work item.

Certain embodiments disclosed herein may provide one or more technical advantages. A technical advantage of the embodiments may include enabling the operating system to be power aware and scalable as the scheduler may make power aware decisions of the usage of CPUs and memory based on the overall system state as well as the information provided from the application. Another technical advantage may include that the scheduling may be based on available information (e.g., the constraints of the queued work items) rather than the prediction of future CPU needs (e.g., rather than entering a power-saving mode based on unknown, predicted information, the operating system can make decisions based on known facts). Another technical advantage may include that a programmer may only need to consider which type of queues to use for a given work item without worrying about how to optimize the power usage when developing an application. Certain embodiments disclosed herein may provide none, some, or all of the above technical advantages. One or more other technical advantages may be readily apparent to one skilled in the art in view of the figures, descriptions, and claims of the present disclosure.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Scheduling Work Items Based on Declarative Constraints

In particular embodiments, an operating system may optimize CPU power usage by allocating work items into different queues based on the declarative constraints of the work items and then processing the queued work items accordingly as determined by a scheduler. Once the work items in one or more queues are processed in accordance with their declarative constraints, one or more cores of the CPU may enter a sleep mode until a wake-up signal is received for processing additional work items, thereby resulting in efficient usage of CPU power (longer, less fragmented sleep time allows the CPU to enter a deeper sleep state). To begin with, an application may create a few queues with each being associated with certain declarative attributes defined by the application. The operating system may then enqueue work items into different queues by considering the relationship between the declarative constraints and the declarative attributes. Based on the queued work items and the corresponding declarative attributes, the scheduler may determine how the work items should be processed. Furthermore, each of the cores may have its own computing feature, e.g., high performance or energy efficiency. The scheduler may further determine which core to use for particular queued work items based on such computing feature. Although this disclosure describes scheduling particular work items via particular systems in particular manners, this disclosure contemplates scheduling any suitable work item via any suitable system in any suitable manner.

In particular embodiments, the operating system may generate, by an application executing on a client system, one or more queues. Each queue may be associated with one or more declarative attributes. Each declarative attribute may declare a processing requirement or a processing preference. In particular embodiments, the operating system may then generate one or more work items to be processed. For each of the one or more work items, the operating system may enqueue the work item into a selected one of the one or more queues based on the one or more declarative attributes associated with the selected queue. In particular embodiments, the operating system may further provide the one or more queues to a scheduler of an operating system of the client system. The scheduler may be configured to schedule each of the one or more work items for processing based on one or more policies and the one or more declarative attributes of the selected queue for that work item.

In particular embodiments, each of the one or more work items may be associated with a declaration. The declaration may comprise one or more of a declaration for a time constraint, a declaration for a resource preference, or a declaration for a priority. Correspondingly, the processing requirement or the processing preference may be based on one or more of the time constraint, the resource preference, or the priority. In particular embodiments, the resource preference comprises one or more of high performance or energy efficiency. In particular embodiments, the time constraint may comprise one or more of a wake-up latency or a deadline. Wake-up latency may be a relative measure that depends on when the work item is put into the queue. Optimizing the wake-up latency without ruining the power consumption is important. Conventional operating system may not have wake-up latency, which means whenever a core gets a wake-up signal for a work item, it would wake up and process the work item. Wake-up latency may be particularly unique for the embodiments disclosed herein. With wake-up latency, while waiting a scheduler may check if there are more work items coming into queues, which can all be batched together for processing. Deadline may be more of an absolute measure of when the work items need to be processed.

In particular embodiments, the priority may comprise one or more of interactive, background, maintenance, or long running. Priority may be an arbitrary set of levels. Priority may be used to determine which work item should be run first when the core is woken up. When a queue is associated with a higher priority, the core may run its enqueued work items before running the work items enqueued in other queues with lower priorities. As an example and not by way of limitation, the priority may indicate some work items as an optional background work items. These work items may only be executed if the system has enough power to provide to process these optional background work items. As a result, even though the work items would be processable, they may not get scheduled due to the power constraints. This mode may make sense for periodic queues of work items that have to process optional background work items that improve the user experience but are not required for the process to operate correctly.

In particular embodiments, once the queues are created, the operating system may use an asynchronous runtime service to determine how the enqueued work items should be processed. Each of the one or more work items may be scheduled to be processed on a core. The core may have one or more of high performance or energy efficiency. In particular embodiments, each of the one or more work items may be scheduled to be processed on a core. The core may be based on one or more of high power mode, normal power mode, or low power mode. In particular embodiments, the one or more policies may specify which core of one or more cores to use to process each work item based on the one or more declarative attributes of the selected queue for that work item. In particular embodiments, the operating system may receive, at a core, a scheduled work item. A power status associated with the core may indicate the core is in a sleep mode. As a result, the operating system may determine, based on a declaration associated with the scheduled work item, whether to wake up the core to process the work item.

In particular embodiments, when an application starts, its code may instruct what queues to create for each of its work items. As an example and not by way of limitation, there may be an interrupt queue, a preferred work queue, or a sensor processing queue, etc. The sensor sensing queue may process incoming sensor data. Depending on the nature of the work item (e.g., an event handler work item, a background work item, etc.), the queue may be designated with particular declarative attributes. In addition, different APIs may be provided to application developers to create queues. Part of the APIs provided may be predefined queue types (e.g., INTERACTIVE, BACKGROUND, PRELOAD, etc.). After a queue is created, then an enqueue method may allow work items to be placed into that queue. When creating a queue, the application may require that each work item that is put into the queue should be processed within a certain amount of time. The application may also need to create work items for event-handling (i.e., whenever a user input is received, the event-handling work items will need to be woken up to handle the input). Since event-handling needs to be done immediately, the queue may be given high priority and with a stringent constraint (e.g., it could be assigned an INTERACTIVE constraint, which might equate to 1 microsecond of acceptable delay time). With the queue setup in such a manner, the scheduler may know how to prioritize/batch the work items to optimize for power consumption. As an example and not by way of limitation, the operating system may receive, at a core, one or more first scheduled work items in a first queue. The operating system may then receive, at the core, one or more second scheduled work items in a second queue. The operating system may then batch one or more of the first scheduled work items and one or more of the second scheduled work items based on declarations for the one or more of the first scheduled work items and the one or more of the second scheduled work items. In particular embodiments, the operating system may further process, by the core, the batched first work items and second work items.

A process/application may, from time to time, have code that sends signals to a core to wait or go to sleep. During that time, events could arrive (e.g., I/O input, notification from application, etc.). An event may be an occurrence that happens asynchronous from the perspective of a given process. An event may have a source such as an interrupt, a message arriving on a channel, etc. Event notifications intended for the process/application may be sent to the process/application via a "port." Every kernel system call API may be asynchronous and use ports to signal progress such as completion of an operation. These event notifications received via the port may be put on a queue. In particular embodiments, the operating system may receive, at a core, a scheduled work item in a queue. The queue may be associated with a first priority. The operating system may then receive, via a port associated with the queue, an event associated with a second priority. The operating system may then determine that the second priority is higher than the first priority. As a result, the operating system may defer processing of the scheduled work item in the queue and processing, at the core, the received event.

When the scheduler of the asynchronous runtime service determines what to process, it may check the status and declarative attributes of the queues. Once the asynchronous runtime service selects one or more work items in a queue to resume, a CPU core assigned to the queue may awake from its wait-state and process the queued work items. As an example and not by way of limitation, when a user touches the screen of a mobile phone, it may become an event and the core may need to run relevant work items to wake up the phone.

Figure 1:
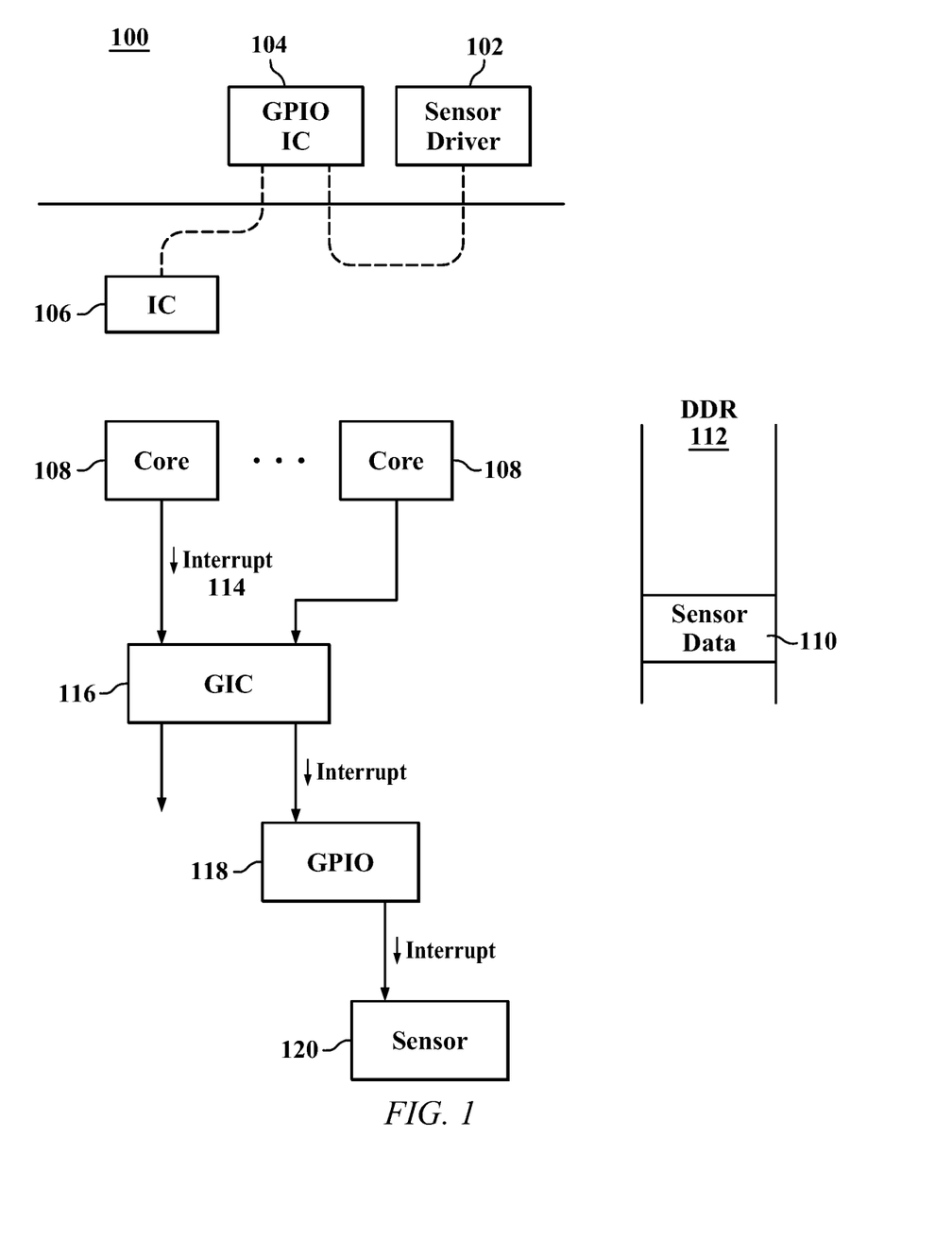
FIG. 1 illustrates an example scheduling of an interrupt from a sensor driver.

FIG. 1 illustrates an example scheduling 100 of an interrupt from a sensor driver. As displayed in FIG. 1, a sensor driver 102 may be associated with a general-purpose input/output (GPIO) interrupt controller (IC) 104, which is associated with an interrupt controller (IC) 106. There may be multiple cores 108. When sensor data 110 is written into a memory, e.g., DDR 112 as demonstrated in FIG. 1 by the sensor driver 102, it may trigger an interrupt 114 on different cores 108. As soon as the sensor data 110 is available, the interrupt 114 is signaled from the cores 108 to a general interrupt controller (GIC) 116. The GIC 116 may determine that the interrupt 114 is for a GPIO provider 118 and therefore signal the interrupt 114 to the GPIO provider 118. By inspecting the device registers, the GPIO provider 118 may identify that the interrupt 114 is associated with a sensor 120. As a result, the GPIO provider 118 may further send the interrupt 114 to the sensor 120. All the interrupt 114 may have a queue and be registered with priority. When an interrupt 114 fires, it may trigger an event to get pushed into a port.

Figure 2:
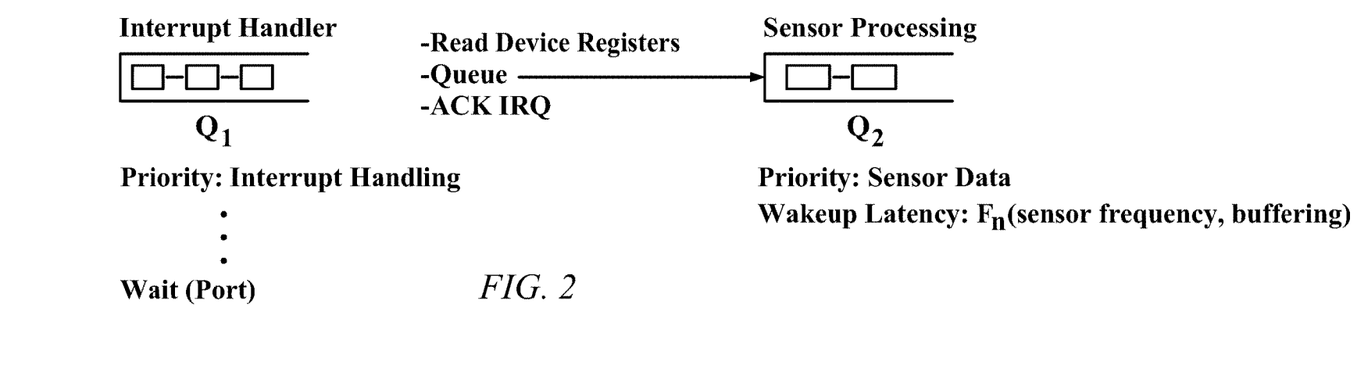
FIG. 2 illustrates example queues associated with interrupt handlers and sensor processing.

FIG. 2 illustrates example queues associated with interrupt handlers and sensor processing. As displayed in FIG. 2, there may be a queue, i.e., Q1, for the interrupt handler, and another queue, i.e., Q2, for the sensor processing. Each queue may have its own declarative attributes. For example, the priority for Q1 may be interrupt handling whereas the priority for Q2 may be sensor data. Q2 may additionally have a declarative attribute based on wake-up latency which is determined by a function $F_n$ where sensor frequency and buffering are its input. Q1 may be further sent to a port to wait. For Q1, the A-sync runtime service may read the device registers, queue the work items, and then acknowledge the interrupt queue has been queued.

In particular embodiments, one or more CPU cores may form one or more processor clusters, e.g., two clusters. One cluster may be designed for high performance, while the other cluster may be designed for energy efficiency. Each CPU core may have its own L1 cache, while each cluster may have its own L2 cache. An interconnect may assure cache coherency between the two processor clusters. In particular embodiments, the scheduler may be power aware, which means that based on information provided by a queue, the scheduler may favor to schedule the queue to be processed on the high performance cluster, or on the energy efficient cluster. To save power, the operating system may only run the high performance cluster if it is really required, and try to leverage the cores in the energy efficient cluster as much as possible. In particular embodiments, a queue may be able to state its affinity to one of the two clusters. In particular embodiments, the asynchronous runtime service may determine the affinities between different queues with respect to different clusters. The purpose and benefit of the affinities may include increasing cache hit rate in a situation where two queues operating on the same data are scheduled to run far apart in time and processing the second queue needs to move the data from DDR back into cache as the data may no longer be in cache when the second queue starts to be processed. Such situation costs more computing resources. By contrast, based on the determined affinities, the operating system may learn whether the likelihood of the data being processed by the queues are the same and therefore schedule such queues to be processed closer in time to increase the likelihood of the data remaining in cache during processing (i.e., increase cache hit rate). As long as both clusters are active, the affinity may be honored. The operating system may determine which workloads really require that both clusters are active, or whether it may mostly deal with workloads where only one cluster is active at a time. In case that only the high performance cluster is active, queues that are scheduled to be processed by the energy efficient cluster may get scheduled onto the high performance cluster if the power required to reactivate the energy efficient cluster would exceed the power to run the queues on the high performance cluster. In particular embodiments, the operating system may make a decision based on whether the activation of the energy efficient cluster is justified, or whether a queue should be scheduled on the current active high performance cluster. A queue may be marked with an affinity for the high performance cluster if processing it on the energy efficient cluster would require overall more energy due the longer run time, or since its execution deadline could not be met by the energy efficient cluster.

Figure 3:
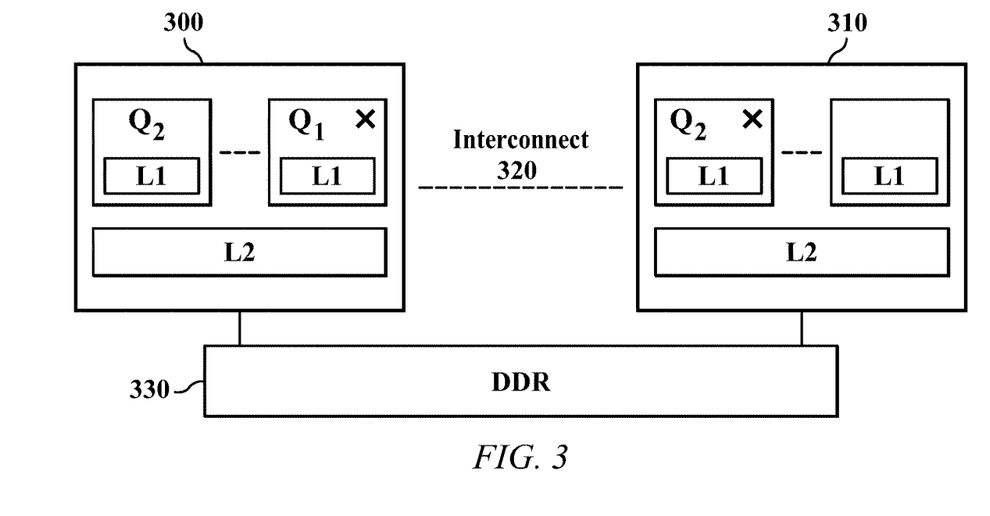
FIG. 3 illustrates example clusters of CPU cores for processing two queues.

FIG. 3 illustrates example clusters of CPU cores for processing two queues. As displayed in FIG. 3, there may be two clusters of cores. The first cluster 300 may be designed for high performance, while the second cluster 310 may be designed for energy efficiency. Each core may have its own L1 cache, while each cluster may have its own L2 cache. An interconnect 320 may assure cache coherency between the two processor clusters. Both clusters may be connected to the main memory, i.e., DDR 330 as indicated in FIG. 3. The system may optimize the usage of the clusters by determining how the two queues should be processed by the clusters. The determination may be based on affinity between a queue and a cluster. As an example and not by way of limitation, the first solution may be processing Q1 on a CPU core of the first cluster and processing Q2 on a CPU core of the second cluster. The second solution may be processing both Q1 and Q2 on two CPU cores of the first cluster. For example, if both queues need to read the same data, it may be more efficient to process them on the same cluster involving the same cache where the data is stored.

Figure 4:
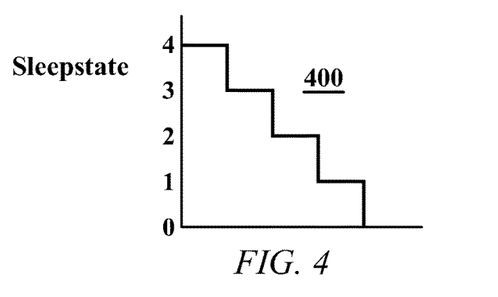
FIG. 4 illustrates an example curve of sleep state with respect to power consumption.

FIG. 4 illustrates an example curve 400 of sleep state with respect to power consumption. As displayed in FIG. 4, the sleeping states may comprise sleep state 1, sleep state 2, sleep state 3, and sleep state 4. In particular embodiments, a computer in one of these states may be not performing any computational tasks and appear to be off. A sleeping computer may retain memory state, either in the hardware or on disk. The operating system need not be rebooted to return the computer to the working state. With each successive sleep state, from 1 to 4, more of the computer may be shut down. In particular embodiments, in sleep state 1 the computer may consume more power than in the other sleep states. In sleep state 2, the computer may consume less power than in sleep state 1 and more power than in the sleep state 3 and sleep state 4. In sleep state 3, the computer may consume less power than in sleep state 2 and more power than in sleep state 4. In sleep state 4, the computer may consume less power than in sleep state 3.

Figure 5:
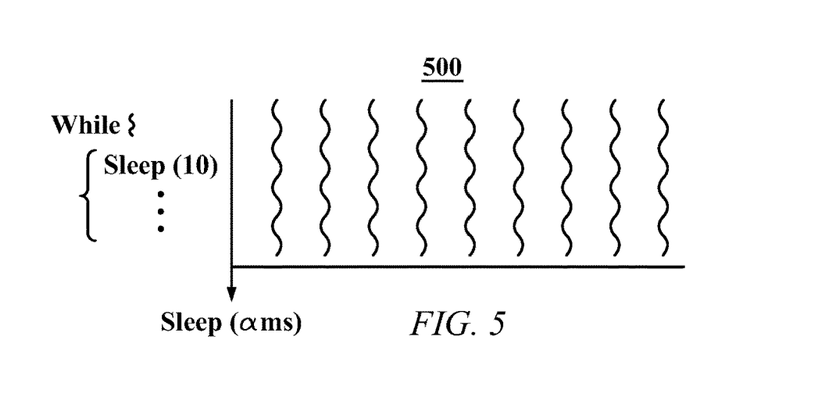
FIG. 5 illustrates an example conventional execution of work items.

FIG. 5 illustrates an example conventional execution 500 of work items. The conventional execution 500 may be based on a one-by-one manner. For example, as demonstrated by the pseudo code in FIG. 5, while one work item is selected to be processed on a CPU core, the CPU core may process it and then sleep for a certain amount of time, e.g., 10 ms. The CPU core would wake up to process another selected work item after 10 ms.

Figure 6:
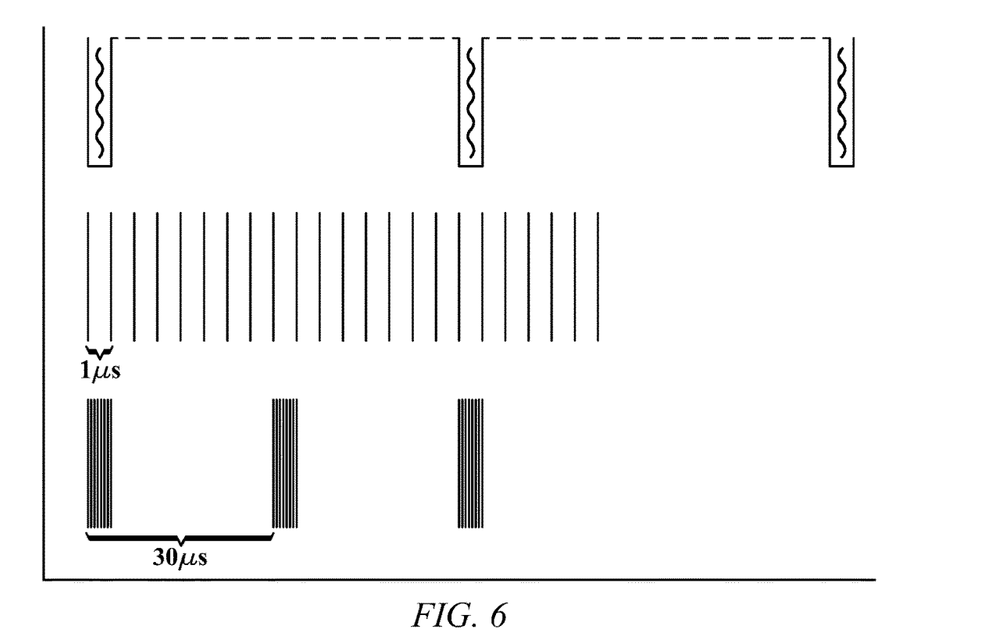
FIG. 6 illustrates an example comparison between conventional execution of work items and execution of work items by the embodiments disclosed herein.

FIG. 6 illustrates an example comparison between conventional execution of work items and execution of work items by the embodiments disclosed herein. In FIG. 6, the first row indicates that there are many work items waiting to be processed. The second row indicates how conventionally these work items may be processed. To be more specific, a CPU core may process one work item, enter the sleep mode for 1 µs, wake up to process the next work item, and repeat such cycle until all the work items are processed. As can be seen, such processing may be not efficient as the CPU core is waken up and then enter sleep mode for many times and each time costs computing power usage. The third row indicates how the embodiments disclosed herein process these work items. The operating system may batch different work items together and process them on a CPU core, then let the CPU core enter the sleep mode for 30 µs and also turn down the memory to save power, wake up the CPU core to process another batch of work items, and repeat such cycle until the work items are processed. As can be seen, such processing may be more efficient as the CPU core only goes through a few cycles of waking up, sleeping, and waking up again. In addition, each time when the CPU core enters the sleep mode it may sleep for a much longer time. As another example comparison, in a conventional execution, if a CPU core is tasked with processing 5 one-millisecond work items in a span of 10 milliseconds, it may perform 5 work items with one millisecond intervals for sleep. In the embodiments disclosed herein, the CPU core may process the 5 one-millisecond work items in one batch and be allowed to sleep for 5 milliseconds. The longer uninterrupted sleep duration allows the CPU core to optimize the usage of power, as it could enter a heightened power-saving mode.

Figure 7:
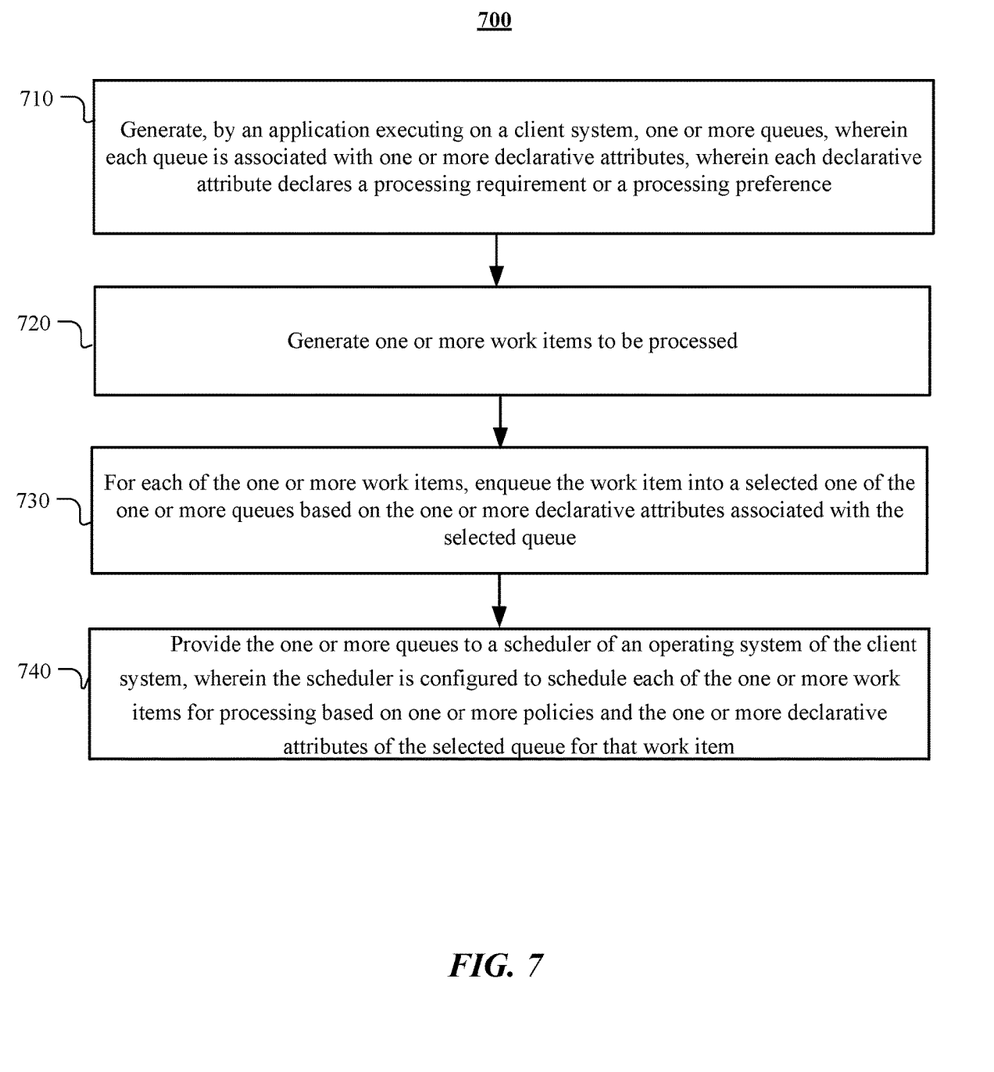
FIG. 7 illustrates an example method for scheduling work items with power efficiency.

FIG. 7 illustrates an example method 700 for scheduling work items with power efficiency. The method may begin at step 710, where the operating system may generate, by an application executing on a client system, one or more queues, wherein each queue is associated with one or more declarative attributes, wherein each declarative attribute declares a processing requirement or a processing preference. At step 720, the operating system may generate one or more work items to be processed. At step 730, the operating system may, for each of the one or more work items, enqueue the work item into a selected one of the one or more queues based on the one or more declarative attributes associated with the selected queue. At step 740, the operating system may provide the one or more queues to a scheduler of an operating system of the client system, wherein the scheduler is configured to schedule each of the one or more work items for processing based on one or more policies and the one or more declarative attributes of the selected queue for that work item. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for scheduling work items with power efficiency including the particular steps of the method of FIG. 7, this disclosure contemplates any suitable method for scheduling work items with power efficiency including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Systems and Methods

Figure 8:
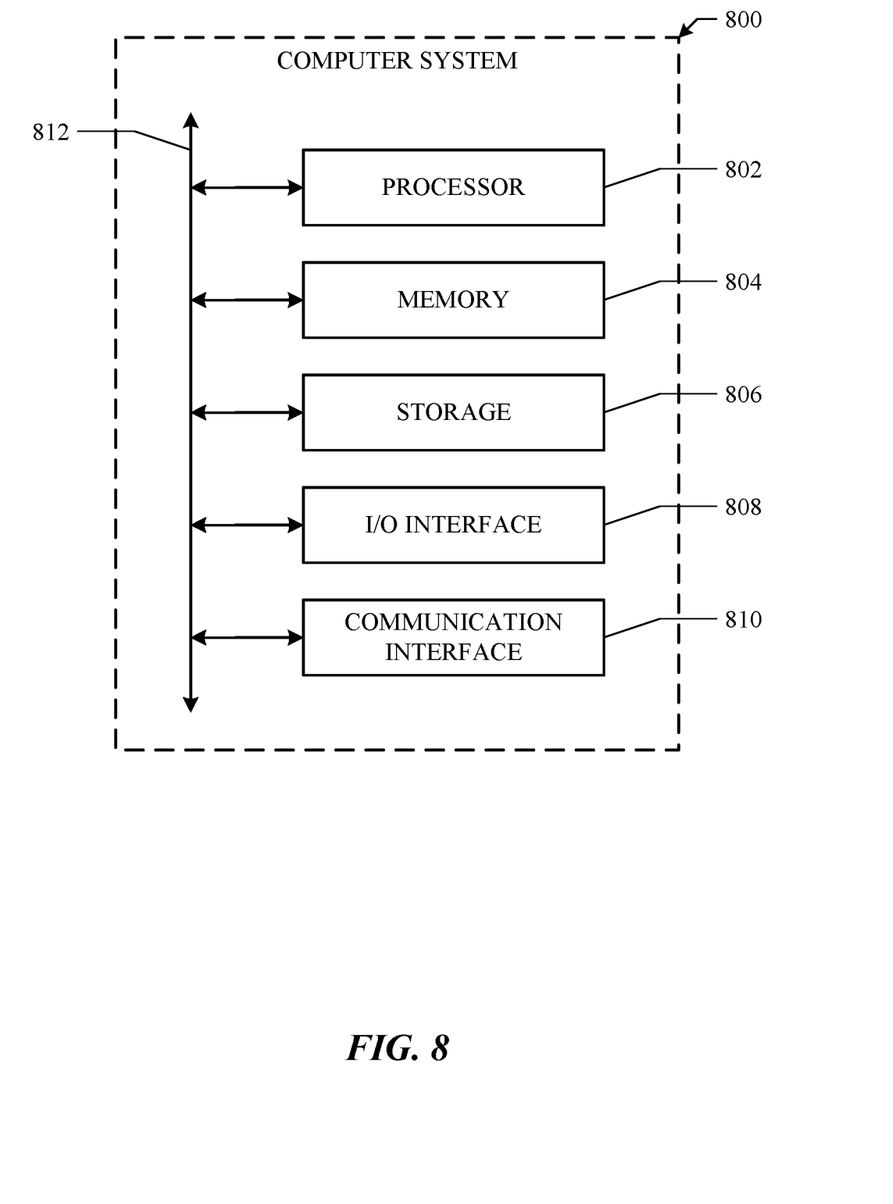
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   generating, by a user application executing on top of an operating system of a client system, a plurality of queues, wherein each queue is associated with one or more declarative attributes, wherein each declarative attribute declares a processing requirement or a processing preference of the queue;
   generating, by the user application, one or more work items to be processed;
   for each of the one or more work items, enqueuing the work item into a selected one of the plurality of queues based on the one or more declarative attributes associated with the selected queue;
   providing the plurality of queues to a scheduler of the operating system of the client system, wherein the scheduler is configured to schedule each of the one or more work items for processing based on one or more policies and the one or more declarative attributes of the selected queue for that work item; and
   generating at least a first batch of first work items by selecting one or more first work items from one or more first queues based on declarations for the one or more first work items and at least a second batch of second work items by selecting one or more second work items from one or more second queues based on declarations for the one or more second work items, wherein the first batch of first work items are scheduled to be batch processed at a first core within a waking-up cycle associated with the first core based on declarative attributes associated with the one or more first queues, and wherein the second batch of second work items are scheduled to be batch processed at a second core within a waking-up cycle associated with the second core based on declarative attributes associated with the one or more second queues.

2. The method of claim 1, wherein each of the one or more work items is associated with a declaration, and wherein the declaration comprises one or more of a declaration for a time constraint, a declaration for a resource preference, or a declaration for a priority.

3. The method of claim 2, wherein the time constraint comprises one or more of a wake-up latency or a deadline.

4. The method of claim 2, wherein the resource preference comprises one or more of high performance or energy efficiency.

5. The method of claim 2, wherein the priority comprises one or more of interactive, background, maintenance, or long running.

6. The method of claim 2, wherein the processing requirement or the processing preference is based on one or more of the time constraint, the resource preference, or the priority.

7. The method of claim 1, wherein each of the one or more work items is scheduled to be processed on a core, wherein the core has one or more of high performance or energy efficiency.

8. The method of claim 1, wherein each of the one or more work items is scheduled to be processed on a core, wherein the core is based on one or more of high power mode, normal power mode, or low power mode.

9. The method of claim 1, wherein the one or more policies specify which core of one or more cores to use to process each work item based on the one or more declarative attributes of the selected queue for that work item.

10. The method of claim 1, further comprising:
    receiving, at a core, a scheduled work item, wherein a power status associated with the core indicates the core is in a sleep mode; and
    determining, based on a declaration associated with the scheduled work item, whether to wake up the core to process the work item.

11. The method of claim 1, further comprising:
    receiving, at a core, a scheduled work item in a queue, wherein the queue is associated with a first priority;
    receiving, via a port associated with the queue, an event associated with a second priority;
    determining that the second priority is higher than the first priority;

deferring processing of the scheduled work item in the queue; and processing, at the core, the received event.

12. One or more computer-readable non-transitory storage media embodying software that is operable when executed to:

generate, by a user application executing on top of an operating system of a client system, a plurality of queues, wherein each queue is associated with one or more declarative attributes, wherein each declarative attribute declares a processing requirement or a processing preference of the queue;

generate, by the user application, one or more work items to be processed;

for each of the one or more work items, enqueue the work item into a selected one of the plurality of queues based on the one or more declarative attributes associated with the selected queue;

provide the plurality of queues to a scheduler of the operating system of the client system, wherein the scheduler is configured to schedule each of the one or more work items for processing based on one or more policies and the one or more declarative attributes of the selected queue for that work item; and generate at least a first batch of first work items by selecting one or more first work items from one or more first queues based on declarations for the one or more first work items and at least a second batch of second work items by selecting one or more second work items from one or more second queues based on declarations for the one or more second work items, wherein the first batch of first work items are scheduled to be batch processed at a first core within a waking-up cycle associated with the first core based on declarative attributes associated with the one or more first queues, and wherein the second batch of second work items are scheduled to be batch processed at a second core within a waking-up cycle associated with the second core based on declarative attributes associated with the one or more second queues.

13. The media of claim 12, wherein each of the one or more work items is associated with a declaration, and wherein the declaration comprises one or more of a declaration for a time constraint, a declaration for a resource preference, or a declaration for a priority.

14. The media of claim 13, wherein the time constraint comprises one or more of a wake-up latency or a deadline.

15. The media of claim 13, wherein the resource preference comprises one or more of high performance or energy efficiency.

16. The media of claim 13, wherein the priority comprises one or more of interactive, background, maintenance, or long running.

17. The media of claim 13, wherein the processing requirement or the processing preference is based on one or more of the time constraint, the resource preference, or the priority.

18. The media of claim 12, wherein each of the one or more work items is scheduled to be processed on a core, wherein the core has one or more of high performance or energy efficiency.

19. A system comprising: one or more processors; and a non-transitory memory coupled to the processors comprising instructions executable by the processors, the processors operable when executing the instructions to:

generate, by a user application executing on top of an operating system of a client system, a plurality of queues, wherein each queue is associated with one or more declarative attributes, wherein each declarative attribute declares a processing requirement or a processing preference of the queue;

generate, by the user application, one or more work items to be processed;

for each of the one or more work items, enqueue the work item into a selected one of the plurality of queues based on the one or more declarative attributes associated with the selected queue;

provide the plurality of queues to a scheduler of the operating system of the client system, wherein the scheduler is configured to schedule each of the one or more work items for processing based on one or more policies and the one or more declarative attributes of the selected queue for that work item; and generate at least a first batch of first work items by selecting one or more first work items from one or more first queues based on declarations for the one or more first work items and at least a second batch of second work items by selecting one or more second work items from one or more second queues based on declarations for the one or more second work items, wherein the first batch of first work items are scheduled to be batch processed at a first core within a waking-up cycle associated with the first core based on declarative attributes associated with the one or more first queues, and wherein the second batch of second work items are scheduled to be batch processed at a second core within a waking-up cycle associated with the second core based on declarative attributes associated with the one or more second queues.

* * * * *